United States Patent [19]

Swift et al.

[11] 4,230,772

[45] Oct. 28, 1980

[54] AMINE CROSSLINKED METHACROLEIN COPOLYMERS FOR COATINGS, BINDERS AND ADHESIVES

[75] Inventors: Graham Swift, Blue Bell; Benjamin Bartman, Norristown; Harry J. Cenci, Warminster, all of Pa.

[73] Assignee: Rohm and Haas Company, Philadelphia, Pa.

[21] Appl. No.: 26,145

[22] Filed: Apr. 2, 1979

[51] Int. Cl.² .......................... B32B 17/10; B05D 3/02
[52] U.S. Cl. ..................................... 428/442; 156/331; 260/29.6 TA; 427/393; 427/385.5; 428/463; 428/514; 428/520; 526/312; 526/315; 427/389.7; 427/393.5; 427/388.3
[58] Field of Search ................ 427/389, 385 R, 388 B, 427/385 A, 393, 385 B; 260/859 R, 875, 29.6 TA; 526/312, 255, 315; 156/331; 428/463, 442, 461, 514, 520; 206/219

[56] References Cited

U.S. PATENT DOCUMENTS

| | | | |
|---|---|---|---|
| 3,177,171 | 4/1965 | Gruber et al. ................ | 526/315 X |
| 3,497,485 | 2/1970 | Emmons ........................ | 526/312 |
| 3,896,085 | 7/1975 | Larsson et al. ................ | 427/389 X |
| 4,104,230 | 8/1978 | Chang et al. .................. | 428/463 X |
| 4,126,596 | 11/1978 | Schimmel et al. ............ | 260/836 X |

FOREIGN PATENT DOCUMENTS 601187  7/1960  Canada ............................. 526/315

Primary Examiner—Ronald H. Smith
Assistant Examiner—Thurman K. Page
Attorney, Agent, or Firm—Harold L. Greenwald

[57] ABSTRACT

Aqueous, solution or emulsion, and solvent based compositions comprising a crosslinked vinyl addition polymer having methacrylaldimine crosslinking groups are useful as coatings, binders and adhesives. The polymers are prepared from a crosslinkable composition comprising (A) a vinyl addition homopolymer or copolymer of methacrolein and (B) a compound having at least two amine-function groups selected from primary amine and primary amine-generating groups. A method of use is described in which crosslinking is at ambient temperatures.

15 Claims, No Drawings

AMINE CROSSLINKED METHACROLEIN COPOLYMERS FOR COATINGS, BINDERS AND ADHESIVES

BACKGROUND OF THE INVENTION

This invention relates to polymers crosslinked by means of methacrylaldimine linkages or crosslinking groups. The methacrylaldimine crosslinking groups are produced by reaction of vinyl addition homopolymers or copolymers of methacrolein and compounds having at least two primary amine or primary amine-generating, such as aldimine or ketimine, groups. The crosslinking occurs, preferably at ambient temperatures or at elevated temperatures, to produce a crosslinked polymer.

Neher et al, U.S. Pat. No. 2,416,536, teaches the copolymerization of acrolein and methacrolein with acrylic compounds, such as the acid, esters, nitrile, and amides. Neher further teaches that the copolymers containing 10% or more of acrolein or methacrolein are vulcanizable with sulfur. Larsson et al, U.S. Pat. Nos. 3,896,085 and 4,016,127, teach the treatment of leather with copolymers containing acrolein and the curing of these with a poly-primary amine.

The new methacrylaldimine crosslinked polymers are surprisingly superior to acrylaldimine crosslinked polymers in several properties, such as resistance to thermal degradation, resistance to water and aqueous solutions and color stability. Formulations of methacrolein polymers with poly-primary amines have much longer, and thus more useful, pot lives than do the corresponding acrolein polymer formulations.

SUMMARY OF THE INVENTION

The present invention is concerned with a crosslinked vinyl addition polymer comprising methacrylaldimine crosslinking groups, and the preparation and use of the polymer. Generally, the crosslinked polymer is widely useful in applications such as in coating, binder and adhesive formulations. The preferred way of making the crosslinked polymer is to mix a composition comprising (A) a vinyl addition homopolymer or copolymer of methacrolein and (B) a compound having at least two amine functional groups selected from primary amine and primary amine-generating groups. The composition is cured, preferably at ambient temperature, to form the crosslinked polymer. The primary amine-generating groups referred to are groups which, under ambient conditions and in the composition, will generate primary amine groups for reaction with the aldehyde groups of the methacrolein units to produce the methacrylaldimine crosslink or, alternatively, will produce said crosslink by reaction with the aldehyde groups without necessarily going through a stage involving free primary amine groups being present in the reacting composition. Examples of primary amine-generating groups are aldimine and ketimine groups, those based on volatile aldehydes and volatile ketones are preferred.

Component (B) is frequently referred to hereinafter, for the sake of simplicity, as a polyamine containing molecule, but it is to be understood that such passages are intended to embrace component (B) molecules containing imine groups, i.e. aldimine and ketimine groups, or the salts of the amine or imine groups with acids, except where the context is clearly and completely inconsistent with such broader construction. Component (B) may be in the form of a simple small molecule with the required two or more amine groups or it may be polymeric in nature.

Component (A) of the composition is a vinyl addition homopolymer or copolymer of methacrolein. In a copolymer, the methacrolein is copolymerized with other vinyl monomers such as ethylenically unsaturated carboxylic acids, ethylenically unsaturated hydrocarbons, vinyl esters of aliphatic acids, preferably $C_1$ to $C_{11}$ acids, and acrylates and methacrylates including the amides, nitriles and esters, preferably $C_1$ to $C_8$ alkyl esters. Preferably, the component (A) polymer is polymerized from about 2 to 50% methacrolein, about 2 to 20% of the carboxylic acid or a mixture thereof, about 40 to 95% ethylenically unsaturated aromatic hydrocarbons, acrylate esters, methacrylate esters or a mixture thereof, and about 0 to 15% of acrylate or methacrylate amides or nitriles or a mixture thereof. Desirably the acrylate is a $C_1$ to $C_8$ alkyl ester, the methacrylate is a $C_1$ to $C_4$ alkyl ester and the hydrocarbon is styrene or vinyl toluene.

In formulating the composition, consideration is given to the possibility that not all of the aldehyde functions in the methacrolein-containing polymer are available for reaction with the amine. A suitable test for available aldehyde functionality is used and the ratio of (A) to (B) is preferably such as to contain about 1:1 available aldehyde functions to amine functions. The ratios varying somewhat from the 1:1 ratio are also useful, but usually lie within the limits 3:2 and 2:3, and are preferably between 0.9:1 and 1:0.9.

DETAILED DESCRIPTION

The crosslinked vinyl addition polymer of the instant invention comprises methacrylaldimine crosslinking groups of the formula

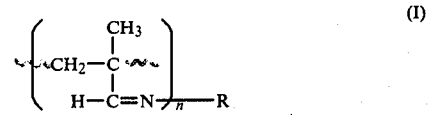

wherein
n is an integer greater than 1 and
R is an organic radical with the functionality n derived from an n-functional primary amine or polyamine. The multi-functional R group is part of the crosslinking group. R is bonded to imine nitrogen atoms of the crosslinking group which are bonded via the adjacent imine carbon atoms, to the methacryl group in the backbone or main chain of the vinyl addition polymer molecules so crosslinked. Preferably, the crosslinked polymer is made from a composition comprising (A) a vinyl addition homopolymer or copolymer of methacrolein and (B) a compound having at least two amine function groups selected from primary amine and primary amine-generating groups. The methacrolein polymer has the mer units

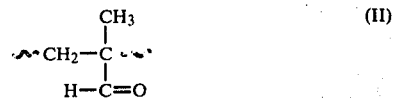

in the vinyl addition polymer chain and the amine has the formula $$R(NH_2)_n \qquad (III)$$

wherein n is an integer greater than 1.

The homopolymer or copolymer of methacrolein is frequently referred to hereinafter, for the sake of simplicity, as the aldehyde-containing polymer. The aldehyde-containing polymer, component (A), is an uncrosslinked linear vinyl addition polymer, or mixture of such polymers, having a weight average molecular weight ($\overline{Mw}$) from about 600 to 3,000,000 or higher. The term "linear" hereinabove being construed to include branched as well as straight chain linkages. For many purposes, the aldehyde-containing polymer is preferably one having a low molecular weight e.g. up to 30,000 $\overline{Mw}$. In some cases it is desirable that the aldehyde-containing polymer have sufficient hydrophilic groups, e.g. —NHR'(R' being lower alkyl), —OH, —COOH, or depending on pH, the carboxyl may be in the form of a salt of an organic amine, other than primary amine, or an alkali metal, to render this component water-dispersible or even water-soluble. The preferred aldehyde-containing polymers are solution polymers of intermediate weight average molecular weight ($\overline{Mw}$), i.e. 10,000 to 100,000, preferably 10,000 to 50,000. Also useful are emulsion polymers with $\overline{Mw}$ above 50,000, preferably 300,000 to 2 million. Some embodiments are preferably water-soluble, others organic solvent soluble, and others are soluble in both water and organic solvents.

The addition polymers constituting component (A) are made by any of the known procedures for vinyl addition polymerization such as bulk polymerization, solution polymerization, suspension polymerization and emulsion polymerization; solution and emulsion polymerization being preferred. Any addition copolymerizable ethylenically unsaturated monomer having a group $H_2C=C<$ or $>C=C<$ may be used for copolymerization except those comprising primary amine groups or groups which generate primary amines under the polymerization conditions.

Certain preferred polymers of component (A) are copolymers of ethylenically unsaturated acids generally in the range of about 2 to 20%, preferably 5 to 10%, by weight. To obtain water dispersible copolymers about 2% to 10% acid is usually employed depending on the hydrophilic nature of the other monomers. When water solubility of the copolymer is desired about 5% to 15% or even more acid monomer is used in the copolymer, the higher levels being needed when the remaining monomers are relatively hydrophobic. Examples of the $\alpha,\beta$-ethylenically unsaturated carboxylic acids which are used in forming copolymers of the present invention, include acrylic, methacrylic, itaconic, aconitic, crotonic, citraconic, methacryloxypropionic, maleic, fumaric, cinnamic, mesaconic, $\alpha$-chloroacrylic and the like acids. Mixtures of these acids can also be used.

The unsaturated hydrocarbon monomers which can be used in forming the copolymers of the present invention, include ethylene, propylene, isobutene, butylene, amylene, hexylene, butadiene, isoprene and particularly the vinyl aromatic monomers such as styrene, vinyl toluene and other alkyl and dialkylstyrenes. Mixtures of these hydrocarbons can also be used. In some preferred embodiments of the invention, the copolymers contain from about 10% to about 20% by weight of unsaturated hydrocarbon monomer.

Examples of the acrylic acid esters which can be used in forming the copolymers of the present invention include the esters of $C_1$–$C_{18}$ alcohols such as benzyl, cyclohexyl, isobornyl, methyl, ethyl, propyl, isopropyl, n-butyl, isobutyl, sec-butyl, tert-butyl, and the several amyl, hexyl, octyl (including 2-ethylhexyl), decyl, dodecyl and octadecyl isomers and the like. Acrylic acid esters of alcohols having other functionality, in addition to the alcohol functionality used in forming the ester, can be used in forming the copolymers of this invention, such as hydroxyethyl, hydroxypropyl, methoxyethoxyethyl, ethoxyethoxyethyl, methoxyethyl, ethoxyethyl, and the like acrylates. Mixtures of these esters can also be used. Preferably, lower alkyl, i.e. ($C_1$–$C_8$) esters of acrylic acid and more desirably ($C_1$–$C_4$) esters of acrylic acid are employed. In some preferred compositions, the copolymers contain from about 10 to about 40% by weight of an acrylic acid ester.

The methacrylic acid esters which can be used as a monomer in forming the copolymers of the present invention, include methyl, ethyl, propyl, isopropyl, butyl, isobutyl, sec-butyl, tert-butyl, amyl, isoamyl, hexyl, cyclohexyl, 2-ethylbutyl, 2-ethylhexyl, octyl, decyl, lauryl, myristyl, cetyl, stearyl, dicyclopentenyl and the like methacrylates. Methacrylic acid esters of alcohols having other functionality, in addition to the alcohol functionality used in forming the ester, can be used in forming the copolymers of this invention, such as hydroxyethyl, hydroxypropyl, methoxyethoxyethyl, ethoxyethoxyethyl, methoxyethyl, ethoxyethyl, and the like methacrylates. Mixtures of these esters can also be used. Preferably lower alkyl, i.e. ($C_1$–$C_8$), and more desirably ($C_1$–$C_4$), esters of methacrylic acid are employed. In some preferred compositions, the copolymers of the invention contain from about 20 to about 60% or even 80% by weight of a methacrylic acid ester. Compositions consisting essentially of methacrolein and methacrylate ester mer units are very useful, particularly where outdoor stability is desired.

Other ethylenically unsaturated monomers can be used in forming the copolymers of the instant invention, such as the esters of vinyl alcohol (including the formic, acetic, propionic, butyric and versatic acid esters; the acetic ester being preferred), acrylonitrile, methacrylonitrile, ethacrylonitrile, phenylacrylonitrile, acrylamide, methacrylamide, ethacrylamide, N-methylol acrylamide, N-monoalkyl and N-dialkyl acrylamides and methacrylamides (including N-monomethyl, -ethyl, -propyl, -butyl, and N-dimethyl, -ethyl, -propyl, -butyl, and the like), the corresponding aromatic amides (such as N-monophenyl- and -diphenyl- acrylamides and methacrylamides), vinyl ethers (such as butyl vinyl ether), N-vinyl lactams (such as N-vinyl pyrrolidone), halogenated vinyl compounds (such as vinylidene fluoride, vinyl chloride, and vinylidene chloride), itaconic monoesters and diesters of the alcohols used in forming the acrylic acid esters, supra, allyl and methallyl esters of saturated monocarboxylic acids (such as those used to form esters of vinyl alcohol, supra), vinyl thiophene, vinyl pyridine, vinyl pyrrole, and ethylenically unsaturated monomers containing a quaternary ammonium group (such as methacryloxyethyl trimethyl ammonium chloide and acryloxyethyl trimethyl ammonium chloride).

The copolymers of the present invention are preferably prepared by conventional solution or aqueous emulsion polymerization techniques, however, bulk, suspension or other polymerization methods can be used.

In coating applications it is preferred to have an aldehyde content ranging from about 5.0 to about 25% by weight. Less preferred formulations and other uses employ up to 35% or even 50% or as little as 2% methacrolein.

Of the many monomers that can be used to copolymerize the methacrolein, those especially preferred include styrene (S), ethyl acrylate (EA), n-butyl acrylate (BA), n-butyl methacrylate (BMA), methyl methacrylate (MMA), acrylonitrile (AN), acrylic acid (AA), and methacrylic acid (MAA).

The solution polymerization may be effected by free radicals obtained from the thermal decomposition of peresters, such as t-butyl peroxypivalate and t-butyl peroctoate. However, any of the conventional free radical initiators can be used, including azonitriles, peroxycarbonates and peroxides. The amount of initiator generally used is ca. 1% to 4% by weight, based on the monomers to be polymerized. However, this amount can be over a broader range, e.g., from about 0.1 to about 10% by weight. Among the useful initiators are the azonitriles such as 2,2'-azobis (isobutyronitrile), 2,2'-azobis (2,4-dimethylvaleronitrile) and 1,1'-azobis (cyclohexanecarbonitrile), the peroxycarbonates such as di(n-propyl) peroxydicarbonate, diisopropyl peroxydicarbonate, dicyclohexyl peroxydicarbonate and di(2-ethylhexyl) peroxydicarbonate, and the peroxides, such as hydrogen peroxide, t-butyl hydroperoxide, benzoyl peroxide, t-butyl peracetate and t-butyl perbenzoate.

As in emulsion polymerization, infra, chain transfer agents can be used to moderate the molecular weight of the copolymer. The same transfer agents and amounts are generally effective.

In the preparation of water soluble or water reducible methacrolein copolymers, the monomers can be polymerized in a water miscible solvent such as butoxy ethanol, ethoxyethyl acetate, isopropanol or isobutanol, and subsequently the acidic groups are neutralized and the system diluted with water. The organic solvent can either be retained as part of the solvent or removed under reduced pressure at a slightly elevated temperature, preferably less than 100° C. The neutralization of the carboxyl functionality, when present in the polymers, can be accomplished with inorganic bases, e.g., sodium or potassium hydroxides, or organic bases not having primary amine functionality, e.g., secondary or tertiary amines, and, amino alcohols and other common bases. The neutralization should be stoichiometric or less to avoid reaction with the aldehyde functionality. The preferred bases for neutralization are tertiary amines such as dimethylamino ethanol, N-methyldiethanol amine, triethyl amine and N-methyl morpholine.

In the preparation of the present copolymers by emulsion polymerization techniques, the emulsifiers or dispersing agents employed and general emulsion polymerization techniques are taught in "Emulsion Polymerization" by F. A. Bovey et al, Interscience Publishers, 1965, and "Emulsion Polymerization" by D. C. Blackley, John Wiley & Sons, publishers, 1975. The polymerizable monomer emulsions can be prepared at a temperature in the range of from about 0° C. to about 100° C. and, if a pressurized reactor is used, even higher, but intermediate temperatures are generally preferred. Although other free radical initiators are useful, peroxide free-radical catalysts, particularly catalytic systems of the redox type, are recommended. Such systems, as is well known, are combinations of oxidizing agents and reducing agents such as a combination of potassium persulfate and sodium metabisulfate. Suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Reducing agents include water-soluble thiosulfates, hydrosulfites, tertiary amines, such as triethanolamine and the like, thiourea and salts of metals such as the sulfate salts of metals capable of existing in more than one valence state such as cobalt, iron, nickel, and copper.

A convenient method of preparing the copolymer latex comprises agitating an aqueous suspension or emulsion of the mixture of copolymerizable monomers and redox catalytic combination at room temperature without the application of external heat. The amount of catalyst can vary but the usual range is from 0.01 to 3.0% of the peroxidic agent and the same or lower proportions of the reducing agent based on the weight of the monomer. In this way, it is possible to prepare latices which contain as little as 1% and as much as 60% or even more of the resinous copolymers on a weight basis. It is more practical and preferred to produce latices which contain from about 30 to about 50% resin solids.

If desired, a chain-transfer agent is used to moderate the molecular weight of the copolymer obtained by the emulsion copolymerization procedure. the art-known chain-transfer agents may be used, such as: long-chain alkyl mercaptans, such as tert-dodecyl mercaptan; alcohols, such as isopropanol, isobutanol, lauryl alcohol, and tertoctyl alcohol; halogenated hydrocarbons, such as carbon tetrachloride, tetrachloroethylene and trichlorobromomethane. Generally, from about 0 to 3%, by weight, based on the weight of the monomer charge, of the chain-transfer agent is used.

The available aldehyde functionality, i.e., reactive sites in the methacrolein copolymers can be determined by oxime formation as described by W. M. D. Bryant and D. M. Smith, Journal of the American Chemical Society, Vol. 57, p. 57 or by nuclear magnetic resonance spectroscopy. The oxime formation method is preferred for it is regarded as a better index of the curing reaction of the invention. The aldehyde availability (expressed as the percentage of the aldehyde charged in the polymerization) is generally 60–75% for methacrolein polymers. The determined available aldehyde is used as a guideline for formulation with the polyfunctional amine crosslinking agent which reacts to give a cured coating material according to the present invention. The preferred coatings are obtained from stoichiometric blends of a polyamine and aldehyde copolymer; the stoichiometry being based on available aldehyde.

The polyfunctional amines which can be used in curing the copolymers, particularly for curing at room temperature, include ethylenediamine, the poly(ethyleneamine) compounds such as diethylenetriamine, triethylenetetramine and tetraethylenepentamine, 1,2-propylene diamine, 1,3-propylene diamine, the butane diamines, the pentane diamines, methane diamine, the other poly-(methylene)amines such as hexamethylene diamine, dihexamethylenetriamine, 2,5-dimethyl-2,5-diaminohexane, isophorone diamine, bis-4,4'-diaminocyclohexylmethane, 1,2-diaminocyclohexane, 2,4-bis(p-aminobenzyl)analine, polyoxyalkyleneamines such as $H_2NCH(CH_3)CH_2[OCH_2CH(CH_3)]_xNH_2$, preferably wherein x is from about 2 to about 35 and

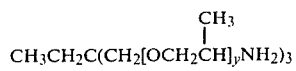

$$CH_3CH_2C(CH_2[OCH_2CH]_yNH_2)_3$$

wherein y may have different values in the three amine terminated groups, the sum of the y values for one molecule being preferably between about 3 and about 15, including the commercial material Jeffamine ® T-403 (Jefferson Chemical Co.) wherein the sum of the values is believed to be 5.3, and the poly(propyleneamine) compounds such as dipropylenetriamine and tripropylenetetramine. Of these Jeffamine T-403 and methane diamine are preferred.

Other amines used as curing agents include polyfunctional amine oligomers and polymers such as the aldimine, ketimine and primary amine polymers disclosed in U.S. Pat. No. 3,037,969. The polymers include homopolymers and copolymers of imines having the formulas

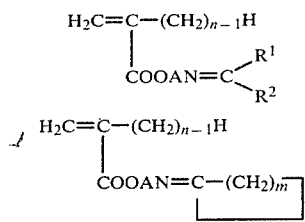

and

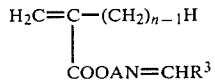

where
m is 4 or 5,
n is 1 or 2,
A is a $(C_2-C_{12})$ alkylene group,
$R^1$ is a $(C_1-C_{12})$alkyl or a cycloalkyl group,
$R^2$ is a $(C_1-C_{12})$alkyl or a cycloalkyl group, and
$R^3$ is selected from the group consisting of phenyl, halo phenyl, and alkoxyphenyl in which the alkoxy group has one to four carbon atoms.
Also the primary amines corresponding to the hydrolysates of these polymers whether or not prepared by a procedure involving the hydrolysis of the imine polymers. That is, the polymers may be made directly from the following primary amine monomer

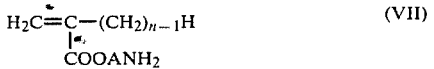

In the same way the polymers disclosed in U.S. Pat. No. 3,497,485 are also useful as curing agents or crosslinkers in the instant invention. These polymers are homopolymers and copolymers of ketimines, aldimines or primary amines having structure

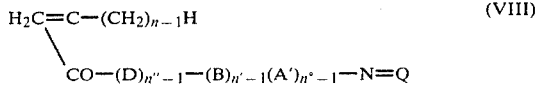

wherein:
Q is selected from the group consisting of $H_2$,

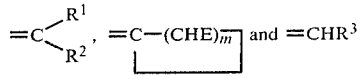

E is H or it may be methyl in one CHE unit,
n, m, $R^1$, $R^2$ and $R^3$ are defined above.
A', B, and D are the same or different oxyalkylene groups having the formula

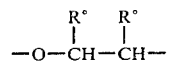

R° being individually selected from the group consisting of H and alkyl radicals having 1 to 2 carbon atoms,
n° is an integer having a value of 1 to 200,
n' is an integer having a value of 1 to 200, and
n" is an integer having a value of 1 to 200, the sum of n°−1, n'−1, and n"−1 having a value of 2 to 200.
Preferred compounds are those of the Formula VIII in which the sum of n°−1, n'−1, and n"−1 has a value of 2 to 10.

U.S. Pat. No. 3,037,969 and 3,497,485 are incorporated herein by reference. In formula VIII Q may represent two hydrogen atoms each bonded to the nitrogen atom, the structure being a primary amine in this instance. A further class of polymeric products having primary amines useful as the crosslinking amine in this invention are those of the oligomeric amino-containing aminolysis products of polymethacrylates or polyacrylates disclosed in U.S. Pat. No. 4,120,839, incorporated herein by reference, comprising multiple primary amine functions.

The "pot-life", i.e. reaction time, of the aldehyde polymer/amine crosslinking system can be controlled by the choice of the polyamine or polyamine-generating crosslinker, available aldehyde and backbone composition of the aldehyde polymer. The reactivity of primary amines is dependent on the nature of the carbon adjacent to the amine. Generally, an amine attached to a primary carbon reacts faster than one attached to a secondary which reacts faster than one attached to a tertiary; i.e. in rate of reaction $R-(CH_2NH_2)_x$ exceeds $R-(CHR^1NH_2)_x$ which exceeds $R-(CR^1R^2NH_2)_x$ where R, $R^1$ and $R^2$ are alkyl groups and x is an integer greater than 1. Copolymerizing methacrolein with bulky monomers, e.g., butyl acrylate, butyl methacrylate or styrene tends to slow the rate of reaction with amines.

The reactivity of the amines with the methacrolein containing polymers can generally be slowed by masking the amines with single mono-aldehydes and -ketones to form ketimines or aldimines as described in U.S. Pat. Nos. 3,037,969, to Hankins et al., and 3,497,485, to Emmons, supra. The reaction is illustrated below:

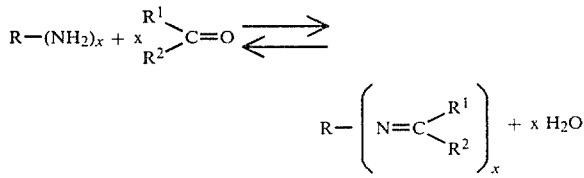

where R, R¹, R² are alkzl groups and x is an integer greater than 1.

The equilibrium of the above react?on is driven to the right by reooval of water and to the left by the addition of water and removal of mono-aldehyde or -ketone. Indeed a rapid reversal to the amine and ketone or aldehyde occurs in the presence of water. Hence, the pot-life of the aldehyde-containing polymer/crosslinker imine formulation is extended since the free amine is not available until water is admitted into the system. In practice, a film is formed, by brushing, casting, rolling, spraying, dipping or other coating or forming means, then atmospheric moisture frees or activates the amine and promotes the crosslinking of the copolymer. The carbonyl compounds which may be employed to mask the amines include those disclosed in U.S. Pat. Nos. 3,037,969 and 3,497,485, preferably, benzaldehyde, halobenzaldehyde, p-chloro-benzaldehyde, m-methoxy benzaldehyde, cyclo-pentanone, cyclo-hexanone, acetone, methyl ethyl ketone, methyl propyl ketone, methyl isobutyl ketone, methyl isopropyl ketone and diisobutyl ketone.

The compositions comprising the amine-containing compound (B) and the polymer of methacrolein (A) have room temperature pot stability falling in the range of about 15 minutes to several days depending on the particular amine-functional compound used for component (B) and the particular methacrolein polymer used therein. An imine-containing compound as component (B) produces considerably longer stability. The stability of both amine and imine group-containing compositions can be enhanced by storage at temperatures below normal ambient temperatures, such as about 10° C. to less than −10° C. Similarly, the stability is generally extended in duration at any given temperature when an appreciable amount of a reaction retardant, such as a volatile ($C_3$ to $C_{10}$)ketone or aldehyde, e.g. acetone or butyraldehyde, is added. The composition is also diluted in effect by the addition of various materials needed to provide modifications of luster, color, and the like, such as fillers and pigments.

The volatile stabilizer that retards the reaction may be used in various amounts of about 0.5 to 80% by weight, based on the total weight of the two reactive components (A) and (B). However, the stabilizer may also serve as a part, or in some instances, as the entire solvent medium for the coating compositions. Thus, acetone, cyclohexanone, methyl ethyl ketone, methyl butyl ketone, diethyl ketone, meethyl hexyl ketone, benzaldehyde, or isobutyraldehyde, may be used in low quantities or proportions of about 0.5 to 3% by weight or even in larger quantities to serve as a component of the vehicle or as the entire solvent component of the vehicle.

Using the methods of formulating given above, the compositions of the present invention may be applied to form clear, protective, and decorative coating and/or impregnate films. However, they may also contain various additives other than those which react to form the cross-linked binder, body, or matrix of the film. Such additives may be plasticizers, such as dioctyl phthalate, pigments and inorganic fillers, such as glass, titanium dioxide, silica, barite, and calcium carbonate, coloring matter, such as dyestuffs, anticorrosive agents, and water-proofing or water-repellents, such as paraffin waxes.

The compositions may be formulated by mixing component (A) with component (B) and suitable solvents, dispersing agents, fillers, pigments and the like and storing the composition, if necessary, at low temperature, such as from about −10° C. to +10° C. until it is used at ambient temperatures. If however, it is not to be used within a period of one to three days, it is more practical to make up the composition as a two-package system, one package containing component (A) and the other component (B). Suitable solvents may be present in either or both packages. Pigments, fillers, and the like may be included in one or the other of the packages or even part in one, and part in the other.

After mixing the two packages in proper proportions, the resulting composition may be used for coating numerous substrates, such as those of metals, wood, glass, and plastics to produce thereon upon ambient curing, with or without acceleration thereof by heating, protective and/or decorative coating films. The films have an outstanding combination of properties, chemical resistance, rust-resistance, durability to weathering, i.e. exposure to UV light, rain, etc., and hardness, toughness, flexibility, and other mechanical properties, including lubricity, frictional effects, etc. Also, the factors of low cost and toxicity involved in manufacture and use taken in conjunction with the properties obtainable on cure provide a versatility obtainable from the compositions of the present invention such that in many instances they may beneficially be used in place of other ambient curing systems heretofore used. The compositions may also be used as binders for fibrous webs to form bonded non-woven fabrics by impregnation of the webs and curing. Since the compositions of the present invention do not depend on air-curing, they are quite useful as adhesives to join sheets or panels of various materials, e.g. glass, metals, wood and plastics, such as those of polyester (Mylar ®), poly(methyl methacrylate), (Plexiglas ®), cellophane, and the like.

The following examples are illustrative of the invention, the parts and percentages are by weight and the temperatures in degrees Celcius, unless otherwise specified. Test methods and preparation steps are as follows, unless specified otherwise in the given example:

Preparation and Testing:
Sand Grind
The components of the sand grind are
200 g $TiO_2$ (pigment)
50 g Resin (methacrolein polymer at 54.4% solids)
100 g Solvent (xylene)
350 g Sand This mixture is ground with a 3" impeller in a drill press at 2400 RPM for 20 minutes. To remove the sand the mixture is filtered through a paint laboratory fine filter cone. The grind is let down with resin, solvent, and amine crosslinker to yield a 40% solids mixture at a 30/70 pigment to binder ratio on a weight basis.

Film Preparation
The paint, prepared as above, is cast on 24 gauge Bonderite ® 40 panels by means of a 7 mil opening drawdown U-caster; dry film thickness is 1.5±0.1/mils. Paints are air dried for 7 days at room temperature or at 140° F.

Pot-Life or Gel time
Pot life is the time, after mixing the methacrolein polymer and amine crosslinker, required for the system to gel as determined by periodic manual stirring of the mixture with a stirring rod.

Hardness
Film hardness is determined on a Tukon Hardness Tester and is reported as Knoop Hardness Number (KHN).

Print Resistance

Pieces of painted Bonderite panels are covered with 2" square cheesecloth squares, a leather disc is placed, smooth side down, on the cheesecloth and appropriate weights placed on the leather disc to product a 2 lbs. per square inch load on the cheesecloth. This sandwich is placed in a preheated 82° C. oven for 2 hours. The print rating is determined by the amount of indentation left by the cheesecloth in the paint as compared to a standard.

Set Time

Set time is the time from casting the film until the film is cured enough so that gently brushing the surface with a paper tissue produces no observable drag on the tissue.

Yellowing

Yellowing is determined by means of a Hunterlab Colorimeter Model D25A-4utilizing the Yellowness Index procedure ASTM D 1925.

Mandrel Blend

The Mandrel Bend Test determines the flexibility of a coating. Samples of the coated metal are bent over a series of mandrels, $\frac{1}{8}"$, $\frac{1}{4}"$ and $\frac{1}{2}"$ in diameter, by hand so as to form a U shaped cross section. The film is observed for cracking both by visual observation and through a 30 magnification power microscope. No signs of cracks in the film is rated zero and the scale increases with the severity of cracking to a rating of 10 for a severely cracked film exhibiting complete delamination from the substrate.

QCT Test

In a closed Cleveland Condensing Cabinet panels are supported at a 45° angle, coated face down, above water in a trough or open reservoir. The water is at 60° C. or other temperature if so specified. Water evaporates from the trough, condenses on the panel and drips back into the trough. This test simulates hot, humid environmental exposure. Coatings are inspected for whitening and blistering.

EXAMPLE 1

Preparation of Butyl Acrylate/Methyl Methacrylate/Styrene/Methacrolein Copolymer Into a reactor equipped with a stirrer, condenser, nitrogen inlet, addition funnels and a thermometer there is charged 135 grams of 2-butoxyethanol. The reactor is then flushed with nitrogen and after the solvent is heated to about 105° C., a monomer mixture consisting of 50 grams or butyl acrylate, 275 grams of methyl methacrylate, 100 grams of styrene and 27.7 grams of t-butyl peroctoate (50%) is fed into the reactor over a period of 2 hours. Starting at the same time, over a period of 2.25 hours there is fed a second monomer mixture of 25 grams of 2-butoxyethanol and 75 grams of methacrolein while the temperature of the reactor mixture is maintained at about 105° C. Immediately after the completion of the feeding of the first monomer mixture, a mixture of 10 grams of 2-butoxyethanol and 2.3 grams of t-butyl peroctoate (50%) is fed into the reactor over a period of 0.25 hours so that the feed is completed at the same time as that of the second monomer mixture. The temperature of the reaction mixture is then held at a temperature of about 105° C. for a period of 0.5 hours. Then, another mixture consisting of 10 grams of 2-butoxyethanol and 4.8 grams of t-butyl peroctoate is fed over a period of 0.25 hours. After this, the reaction mixture is held at about 105° C. for 1 hour, cooled and the product filtered through a 20 micron cartridge filter. The resulting copolymer is at 72% solids, represents 94% conversion and the available aldehyde is 63% of charged aldehyde. The weight average molecular weight ($\overline{Mw}$) is about 17,000.

The resulting copolymer consists of (weight percent) 10% butyl acrylate, 55% methyl methacrylate, 20% styrene and 15% methacrolein (as charged). The polymer solution is diluted to 55% solids with 220 g 2-butoxy ethanol.

EXAMPLE 2

Preparation of Other Methacrolein Copolymers

Following the procedure of Example 1, above, a variety of methacrolein copolymers are prepared. In addition to methacrolein (MAC), the monomers used include methyl methacrylate (MMA), butyl acrylate (BA), styrene (S), butyl methacrylate (BMA) and methacrylic acid (MAA).

In Table I, below, there is provided copolymer composition, polymerization solvent, percent conversion of monomers, percent of available aldehyde and polymerization temperature.

TABLE I

| Copolymer | Composition* (wt. %) | | | | | | Solvent | % Conv. | Avail. Ald.% | P'lym'n T°C. |
| --- | --- | --- | --- | --- | --- | --- | --- | --- | --- | --- |
| | MMA | BA | BMA | St | MAC | MAA | | | | |
| 2a | 0 | 0 | 63 | 20 | 15 | 2 | B.C.[1] | 95 | 52 | 105 |
| 2b | 30 | 40 | 0 | 0 | 20 | 10 | B.C. | 98 | 51 | 105 |
| 2c | 0 | 15 | 50 | 20 | 15 | 0 | B.C. | 97 | 64 | 105 |
| 2d | 0 | 15 | 60 | 20 | 5 | 0 | B.C. | 97 | 84 | 105 |
| 2e | 65 | 0 | 0 | 20 | 15 | 0 | iProH[2]/B.C. | 95 | 76 | 105 |
| 2f | 20 | 0 | 45 | 20 | 15 | 0 | B.C. | 97 | 62 | 105 |
| 2g | 0 | 0 | 63 | 20 | 15 | 2 | B.C. | 95 | 56 | 105 |
| 2h | 0 | 0 | 63 | 20 | 15 | 2 | B.C. | 96 | 69 | 75 |
| 2i | 0 | 0 | 63 | 20 | 15 | 2 | B.C. | 96 | 68 | 75 |

*As charged on a monomer basis.
[1]B.C. is 2-butoxyethanol
[2]iProH is isopropanol; used in the ratio 19 iProH/81 B.C. in preparing 2e

EXAMPLE 3

Methacrolein-Containing Polymer Crosslinked By Amines

For the purpose of evaluating clear films of methacrolein-containing polymers crosslinked by amines, a methacrolein (MAC) copolymer is crosslinked with four different amines. The components are mixed as in the preparation of a sand grind given above but the TiO$_2$ pigment and the sand are omitted so the mixture is 28% solids. The film is prepared in the same way as the pigmented film. Some film samples are cured at ambient temperatures and others at 82° F. for a period of 30 minutes. The polymers and amines are blended at (available) stoichiometric amounts and the ratio of amine function to available aldehyde function is about 1.0:1.0 for each of the polymer/amine blends. The methacrolein (MAC)-containing polymer used in the tests is:

Polymer-P-6—24.7% BA/32.4% MMA/19% S/23.9% MAC made by the procedure of Example 1; available aldehyde is 64% of charged aldehyde, Mw is about 33,000.

The amine crosslinking agents included:
(MDA)—1,8-methane diamine;
(BACHM)—bis-(4-aminocyclohexyl) methane;
(DIBKHMDA)—bis-(diisobutyl ketimine) of hexamethylene diamine; and
(HMDA)—hexamethylene diamine.

In Table II, below, the curing conditions and properties of the cured methacrolein-containing copolymers in clear films are summarized. In the results listed, the hardness is measured on a Tukon Hardness Indenter, and the print resistance, of the film containing the cured copolymers, is determined at a pressure of 2 psi. over a 2 hour period at about 82° C. For comparison, polymer P6 without crosslinker has an immeasurably long pot life and a film shows a very heavy print after seven days air dry.

Example 3e uses acrolein (AC)-containing Polymer P5 —26% BA/34% MMA/20% S/20% AC, made by a procedure similar to that of Example 1. The pot life of the blend with MDA is seen to be much shorter than the methacrolein polymer blend despite the lower blend solids of the acrolein polymer blend. For coatings a longer pot life is required for the usual methods of application. Blended with the other amines the acrolein polymer has a still shorter pot life and thus even less feasible for use in these coatings. Under stringent conditions, a 30 minute bake at 150° C., the print resistance of the acrolein polymer based coating is considerably degraded whereas no comparable degradation occurs in the corresponding methacrolein polymer based coating. The hardness developed in 7 days by the acrolein polymer blend (3e) is considerably less than that of the comparable methacrolein polymer blend (3a). The large difference in hardness, over 50% for each cure condition, is surprising. Hardness is, of course, a very important property of these coatings.

TABLE II

| | | | | | Hardness | | Print |
|---|---|---|---|---|---|---|---|
| Example | Polymer Blend | Blend Solids | Pot Life | Cure Schedule | 1 Day | 7 Days | 7 Days |
| 3a | (P6)/MDA | 51 | 2 hr 18 min | Ambient | 3.5 | 17.2 | mod. |
| | | | | 180° F./30 min | 12.7 | 20.2 | light |
| 3b | (P6)/BACHM | 49 | 18 min | Ambient | 9.2 | 17.9 | light |
| | | | | 180° F./30 min | 11.5 | 18.3 | light |
| 3c | (P6)/HMDA | 50 | 4 min | Ambient | 3.7 | 16.5 | light |
| | | | | 180° F./30 min | 9.6 | 19.3 | light |
| 3d | (P6)/DIBKHMDA | 54 | 1 hr 12 min | Ambient | 5.1 | 16.1 | V. light |
| | | | | 180° F./30 min | 10.5 | 19.5 | V. light |
| 3e | (P5)/MDA | 40 | 14 min | Ambient | 7.2 | 11.4 | light |
| | | | | 180° F./30 min | 12.3 | 12.7 | light |

Clear Film Properties of Methacrolein-Containing Polymers Crosslinked With Amines

EXAMPLE 4

Methacrolein Polymers Crosslinked by a Trifunctional Primary Amine

The methacrolein copolymer of Example 1 is crosslinked by a trifunctional primary amine, Jeffamine ®T-403 (Jefferson Chemical Company) having the structure

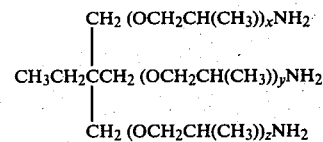

wherein $x+y+z=5.3$.

Properties of the formulation and the films formed are in Table III. The column headed equivalent ratio is the ratio of available methacrolein units in the blend to primary amine units in the blend. The examples with 1/0 ratios are amine-free controls. The pigmented films are prepared as follows:

Sand Grind:
100 g rutile TiO$_2$ (R-960 ®, DuPont)
100 g 15% Methacrolein copolymer at 54.4% in 2 butoxyethanol
50 g Xylene
200 g Sand Enamel:
25 g of above grind filtered
24.4 g of MAC copolymers (54.4%)
4.7 g of Jeffamine T403

Blend on a high speed mixer for approximately 5 minutes before casting. The blend constants are: pigment to binder ratio 30/70, methacrolein copolymers/amine ratio 80/20 (75% of stochiometry based on charged methacrolein), 62% solids.

TABLE III

Clear and Pigmented Film Properties of Methacrolein Polymer/Amine Coatings

| Clear or Pigmented | Equiv. Ratio | Blend Solids | Pot Life | Set Time | Cure Schedule | Hardness | | Print |
|---|---|---|---|---|---|---|---|---|
| | | | | | | 1 Day | 7 Days | 7 Days |
| Clear | 1/0.6 | 45 | 1.5 hrs. | 1.25 hrs. | Ambient | 4.8 | 8.7 | V. light |
| | | | | | 180° F./30 min | 9.4 | 9.8 | V. light |
| Clear | 1/0.75 | 45 | 2.25 | 1.25 | Ambient | 3.9 | 8.8 | light |
| | | | | | 180° F./30 min | 8.7 | 10.5 | V. light |
| Clear | 1/0.9 | 45 | 3.0 | 1.5 | Ambient | 1.5 | 6.4 | V. light |
| | | | | | 180° F./30 min | 7.8 | 13.1 | V. light |
| Clear | 1/1 | 45 | 3.0 | 1.5 | Ambient | 1.8 | 7.1 | V. light |

TABLE III-continued

Clear and Pigmented Film Properties of Methacrolein Polymer/Amine Coatings

| Clear or Pigmented | Equiv. Ratio | Blend Solids | Pot Life | Set Time | Cure Schedule | Hardness 1 Day | Hardness 7 Days | Print 7 Days |
|---|---|---|---|---|---|---|---|---|
| | | | | | 180° F./30 min | 6.4 | 13.8 | light |
| Clear | 1/0 | 45 | (no cure found) | | Ambient | 1.9 | 5.4 | V. heavy |
| | | | | | 180° F./30 min | 6.6 | 9.5 | V. heavy |
| Pigmented | 1/0.6 | 45 | 1.5 | 1.0 | Ambient | 3.4 | 9.2 | light |
| | | | | | 180° F./30 min | 12.5 | 14.4 | V. light |
| Pigmented | 1/0.75 | 45 | 1.5 | 1.0 | Ambient | 2.5 | 9.1 | light |
| | | | | | 180° F./30 min | 10.4 | 12.7 | V. light |
| Pigmented | 1/0 | 45 | (no cure found) | | Ambient | 9.2 | — | V. heavy |
| | | | | | 180° F./30 min | 13.1 | — | V. heavy |

EXAMPLE 5

Yellowing of Amine Crosslinked Copolymers

Methacrolein and acrolein copolymers are intercompared for stability to aging by observing the discoloration of samples heated at 140° F. for seven days, using the ASTM D 1925 determination.

The results in table IV show that discoloration develops far more slowly in the methacrolein copolymer than in that made from acrolein. Both the discoloration and the degradation of print resistance noted above may be due to the poor resistance to oxidation of acrylamide units in the polymer.

TABLE IV

Yellowing Comparison of Methacrolein (P4) vs. Acrolein (P5) Copolymers at 60° C./7 Days on Bonderite 1000

| Sample | K-initial | K-final |
|---|---|---|
| P4/JT-403 | 7.8 | 8.1 |
| P4 alone | 7.4 | 7.9 |
| P4/MDA | 8.0 | 10.1 |
| P5/MDA | 25.2 | 80.9 |
| P5 alone | 12.4 | 14.8 |
| P5/JT-403 | 20.0 | 70.6 |

Polymer P4 - 30% BA/35% MMA/30% S/15% MAC is prepared by following the general procedure of Example 1 except that xylene is used as the solvent.

EXAMPLE 6

Room Temperature Versus Elevated Temperature Curing

Room temperature and elevated temperature cures are compared. The elevated temperature cure, 140° F. for seven days, represents an approximation of the ultimate cure condition of the films. The polymers used are Polymer P2—10% BA/55% MMA/20% S/15% MAC and Polymer P3—20% BA/40% MMA/20% S/15% MAC//5% acrylonitrile. The method of Example 1 is used in the preparation of these polymers except for a change in the solvent system to a 1:1 ratio of 2-butoxyethanol and 2-ethoxyethyl acetate at 54.4% solids. The amines used are Jeffamine T 403 (JT 403) described in Example 4, and MIBKHMDA, the bis(diisobutyl ketimine) of hexamethylene diamine.

The data obtained are in Table V. Results of the QCT. test show the good water resistance of these films, no rusting, no whitening and no blistering at all being found in some of the coatings.

TABLE V

Clear Films: Room Temperature vs. 60° C. Cures

| Polymer Blend | Equiv. Ratio | Cure | Hardness | Print | Mandrel Bend 1/8" | Mandrel Bend 1/4" | Mandrel Bend 1/2" | QCT |
|---|---|---|---|---|---|---|---|---|
| P2/JT403 | 1/0.75 | RT-1 day | 2.0 | light to moderate | — | — | — | — |
| | | RT-7 days | 9.3 | light | 0 | 0 | 0 | d # 8 |
| | | 60° C. 7 days | 14.5 | v. light | 10 | 10 | 10 | pass |
| P3/JT403 | 1/0.75 | RT-1 day | 1.1 | light | — | — | — | — |
| | | RT-7 days | 8.6 | v. light | 0 | 0 | 0 | d # 8 |
| | | 60° C. 7 days | 12.0 | trace | 0 | 0 | 0 | pass |
| P3/MIBKHMDA | 1/0.75 | RT-1 day | 2.0 | light | — | — | — | — |
| | | RT-7 days | 8.2 | light | 0 | 0 | 0 | whitening d # 8 |
| | | 60° C. 7 days | 18.1 | light | 0 | 0 | 0 | tr. whitening |

Notes:
Films were cast on Bonderite 40 (TM Parker Test Panels, Oxy Metal Ind. Corp. Parker Div., Detroit, Mich. 48220).
Film thickness is 1.5 mils
Mandrel bend 0 = no cracks in film, 10 = severe cracks and delamination of film.
QCT test d # 8 - dense blisters, about 8 per 2.5 cm. square.

EXAMPLE 7

Homopolymer of Methacrolein

A methacrolein homopolymer is prepared as follows:

To a reactor, equipped with a mechanical stirrer, a condenser and a thermometer, is added two hundred parts of distilled water, fifty parts of ethanol and thirty-three parts of methacrolein. These are mixed at 20° C. and there is added twenty parts of 0.50 N sodium hydroxide. After ca. five minutes the system is permitted to warm to a maximum temperature of 35° C. under control by an ice water bath. When the evolution of heat subsides the reaction is complete. The product is transferred to a separating funnel and extracted two times with two hundred parts of diethyl ether each time. Finally the product is stripped on a rotary evaporator to yield concentrated oligomeric methacrolein.

The product is a viscous, yellow liquid. Gel permeation chromatography indicates a Mw of 400–800.

The above polymer is crosslinked by formulation with Jeffamine T403 amine at a ratio of one available aldehyde to 0.75 amine group, pigmented and mixed as described above under "Sand Grind". The paint so made cured in 16 hours to a tough coating. The high solids of this system is particularly advantageous in locations where low solvent emissions are required.

We claim:

1. A crosslinked vinyl addition polymer comprising methacrylaldimine crosslinking groups.

2. A composition comprising:
   (A) a vinyl addition homopolymer or copolymer of methacrolein and
   (B) a compound having at least two amine functional groups selected from primary amine and primary amine-generating groups.

3. The composition of claim 2 having a ratio of available aldehyde functions to amine function between 3:2 and 2:3.

4. The composition of claim 3, the copolymer being a polymer of monomers comprising methacrolein and one or more monomers selected from ethylenically unsaturated carboxylic acids, ethylenically unsaturated hydrocarbons, vinyl esters of a $C_1$ to $C_{11}$ aliphatic acid, and amides, nitriles and $C_1$ to $C_8$ alkyl esters of acrylic and methacrylic acids.

5. The composition of claim 4, the monomers comprising, by weight, about 2 to about 50% methacrolein, about 2 to about 20% of a carboxylic acid or a mixture thereof, aout 40 to 95% unsaturated aromatic hydrocarbons, acrylate esters, methacrylate esters or a mixture thereof, and zero to about 15% amides or nitriles of acrylic or methacrylic acids or a mixture thereof.

6. The composition of claim 3 comprising a homopolymer of methacrolein.

7. The composition of claim 3 having the amine-generating groups being aldimine or ketimine groups based on volatile aldehydes or ketones respectively.

8. The composition of claim 5, the methacrolein being 5% to 25%, the acid being acrylic, methacrylic, itaconic or a mixture thereof in the amount of about 5 to 10%, the nitrile being acrylonitrile, the acrylate being a $C_1$ to $C_4$ alkyl ester.

9. The composition of claim 8 wherein the ratio of available aldehyde to amine functions is between 0.9:1 and 1:0.9 and the weight average molecular weight of the methacrolein copolymer being between 10,000 and 100,000.

10. A method of producing a cured, crosslinked polymer comprising the steps of (1) mixing the formulation comprising (A) and (B) of claim 2, to form a crosslinkable composition, (2) applying the composition to a substrate and (3) curing the composition.

11. The method of claim 10 wherein the curing is effected by storage at room temperature.

12. A cured crosslinked polymer obtained by the process of claim 10.

13. A kit comprising requisite amounts of components (A) and (B) of claim 3 in separate vessels.

14. A coating comprising the crosslinking groups of claim 1 in a polymer on a substrate.

15. A coating comprising the composition of claim 2 applied to a substrate.

* * * * *